(12) United States Patent
Judd

(10) Patent No.: US 6,887,389 B2
(45) Date of Patent: May 3, 2005

(54) METHOD AND APPARATUS FOR RECYCLING SEWAGE SLUDGE UTILIZING SPENT WATER-SOFTENER LIME

(76) Inventor: Wendell Judd, 1567 Congress Hill La., Fairfield, OH (US) 45014

( * ) Notice: Subject to any disclaimer, the term of this patent is extended or adjusted under 35 U.S.C. 154(b) by 14 days.

(21) Appl. No.: 10/277,317

(22) Filed: Oct. 23, 2002

(65) Prior Publication Data

US 2004/0079710 A1 Apr. 29, 2004

(51) Int. Cl.$^7$ .......................... C02F 11/06; C02F 11/18
(52) U.S. Cl. .......................... 210/768; 210/770; 210/771; 210/919; 34/343; 34/353; 110/341; 110/342; 110/345; 55/341.11
(58) Field of Search ................ 210/768–770, 210/771, 919; 34/343, 353; 110/204, 224, 233, 341, 342, 345, 346, 210, 215–216, 246, 255, 259; 55/341.1–341.7, 361

(56) References Cited

U.S. PATENT DOCUMENTS

| | | | | | |
|---|---|---|---|---|---|
| 4,028,130 | A | * | 6/1977 | Webster et al. | 106/697 |
| 4,133,273 | A | * | 1/1979 | Glennon | 110/346 |
| 4,245,983 | A | * | 1/1981 | Lindroos | 432/235 |
| 4,466,361 | A | * | 8/1984 | Henery et al. | 588/228 |
| 4,922,841 | A | * | 5/1990 | Kent | 110/346 |
| 5,046,435 | A | * | 9/1991 | Kugler | 110/346 |
| 5,057,009 | A | * | 10/1991 | Nechvatal et al. | 432/14 |
| 5,217,624 | A | * | 6/1993 | Yamane et al. | 405/129.3 |
| RE34,775 | E | * | 11/1994 | Nechvatal et al. | 432/14 |
| 5,377,603 | A | * | 1/1995 | Reese et al. | 110/346 |
| 6,176,187 | B1 | * | 1/2001 | Leonard et al. | 110/215 |

* cited by examiner

Primary Examiner—Robert James Popovics
(74) Attorney, Agent, or Firm—Jack C. McGowan

(57) ABSTRACT

A method and apparatus are disclosed for mixing sewage sludge with spent water-softener lime in a ratio of approximately 10:1 on a wet basis. The mixture is introduced to a rotary pre-dryer kiln and a rotary combuster kiln to kill pathogens. An ash by-product and gases are thereby produced. The ash by-product can be disposed of at much less cost or can be incorporated in a variety of applications such as an aggregate substitute.

2 Claims, 1 Drawing Sheet

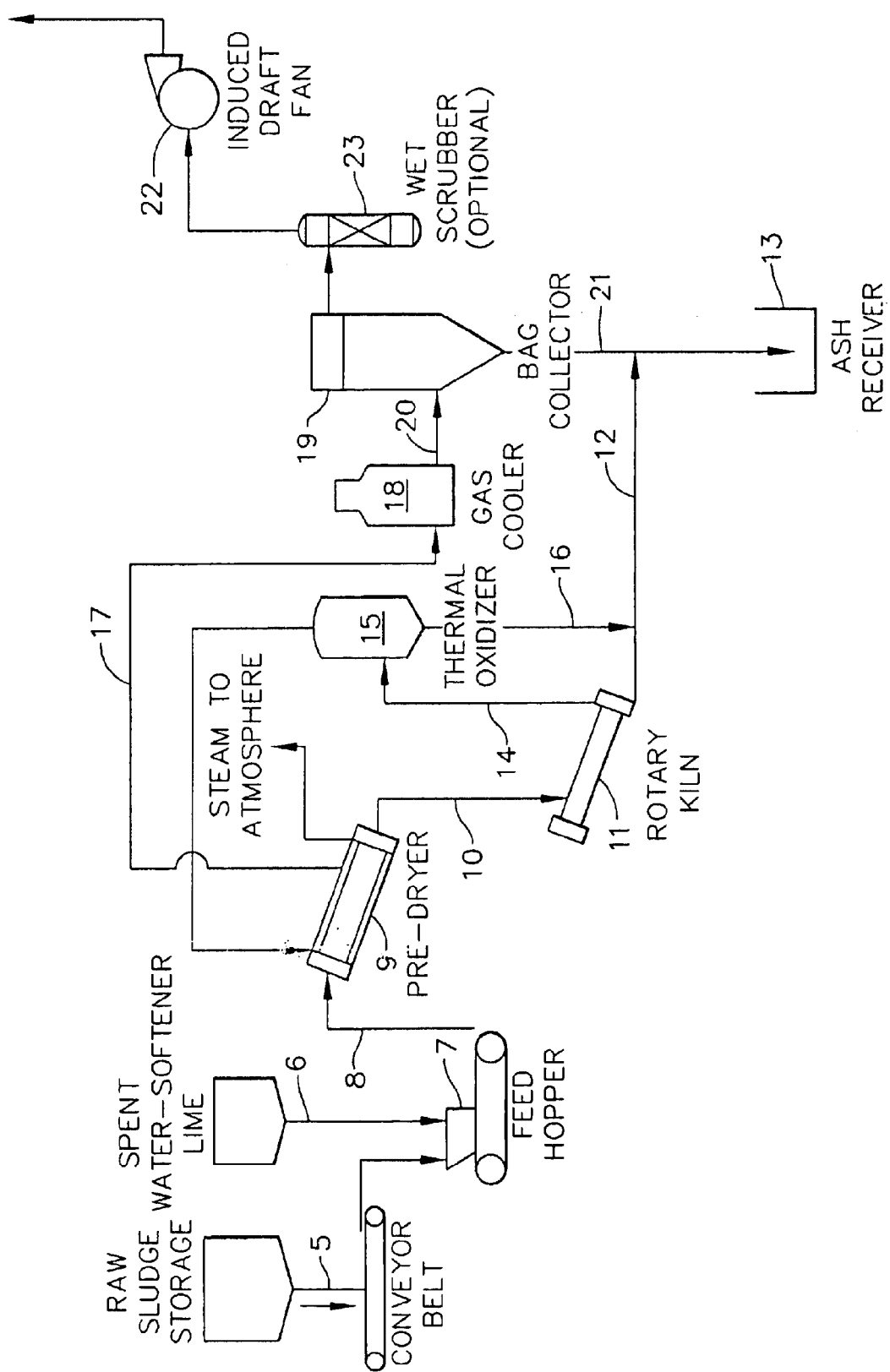

METHOD AND APPARATUS FOR RECYCLING SEWAGE SLUDGE UTILIZING SPENT WATER-SOFTENER LIME

BACKGROUND OF THE INVENTION

The present invention involves an apparatus and process for recycling sewage sludge. In particular, the invention involves the blending and reduction of spent water-softener lime and sewage sludge to produce sludge ash which is reduced by approximately 90 percent and which can be either disposed in an approved landfill or can be incorporated as a binding agent or mineral filler in asphalt concrete, Portland cement concrete and gravel.

Recycling of waste products is a problem which has received considerable attention in an effort to protect the environment. Sewage sludge is a waste product which is typically treated and then either spread on land or is disposed in an approved landfill. Sewage sludge typically has high levels of heavy metals and pathogens. Consequently, where land spreading is practiced, the land can become unacceptably contaminated. Where sewage sludge is disposed of in approved landfills, transportation costs and dumping fees are incurred and the presence of heavy metals and pathogens in the waste product requires an accounting of each load by the landfill operator prior to dumping. Sewage sludge holds large quantities of water which increases the weight and volume of the sludge as well as the cost to dispose of it since dumping fees are typically charged based upon weight. Accordingly, it would be desirous to provide apparatus and a process by which sewage sludge is recycled in a way which reduces the water content of the waste, which removes pathogens from it and which creates a by-product that either can be incorporated into construction materials such as concrete and cement or land spread with less chance of soil contamination.

The present invention satisfies these needs by providing an alternative treatment for sewage sludge by blending it with spent water softener lime. Spent lime, after its use by water softening plants, is presently either being land spread or landfilled itself. Combining spent lime with sewage sludge and subjecting it to the steps of the present invention kills the pathogens in the sewage sludge, reduces the sludge ash by approximately 90 percent and renders a by-product which can be utilized as an aggregate substitute in the production of asphalt concrete, Portland Cement concrete or as a backfilling material for ditches or trenches. The by-product can also be used as a base stabilizer for wet soil during construction. Moreover, the recycled by-product can itself be land spread or deposited in an approved landfill at much less cost and with less danger to the environment because it weighs less and it has less potential for soil contamination.

It is an object of this invention to reduce the possibility of disease bearing air-borne bacteria and reduce the possibility of water contamination associated with sewage sludge.

It is a further object of the invention to reduce heavy metal contamination of the earth caused by disposal of sewage sludge.

Another object of the invention is to reduce unpleasant odors associated with land spreading and land-filling of sewage sludge.

A further object of the invention is reducing the cost including landfill tipping fees of sewage waste disposal.

It is an object of the invention to reduce the burden of record keeping due to elimination of pathogens from sewage waste.

It is an object of the invention to treat sewage sludge so as to provide a resultant material that can be used as an element of construction materials such as a mineral filler, binding agent, an aggregate substitute or aggregate equivalent.

Another object is to provide a valuable use for spent water softener lime which would otherwise need to be disposed, such as in a landfill or land spreading.

A further object of the invention is to provide a process by which spent water softener lime is recycled.

Another object is to treat sewage sludge so as to provide a binding agent for the concrete/cement block industry, asphalt industry and the construction industry.

Moreover, it is an object of the invention to provide a process by which for every ten tons of waste processed, one ton of ash is created.

SUMMARY AND OBJECT OF THE INVENTION

The present invention provides a method and apparatus for recycling sewage sludge. Sewage sludge first is blended with spent water softener lime and is followed by subjecting the mixture then to a pre-dry rotary kiln and then a combuster rotary kiln. The material is thereafter subjected to a thermal oxidizer which produces an ash that is carried to a storage bin. Non-ash by-products are sent to a cooling tower, then to a baghouse controller which entraps residual ash which has precipitated. Resultant gases are exhausted by a fan while the ash is transported from the baghouse controller to a storage bin after which the ash can be transferred to a truck for ultimate use or disposal.

BRIEF DESCRIPTION OF THE DRAWING

FIG. 1 is a schematic illustration of the instant invention.

DETAILED DESCRIPTION OF THE INVENTION

Referring to FIG. 1, sewage sludge is conveyed from line 5 and spent water-softener lime is supplied from line 6 to a divided feed hopper 7. Regulating gates well known in the art are provided within the feed hopper for mixing sewage sludge and spent water-softener lime: the preferred ratio being ten tons of sludge to one ton of lime on a wet basis. The resultant mixture is next fed via an auger through line 8 to a pre-dryer kiln 9. The lime and sludge mixture continue to blend as it is subjected to a rotary motion of approximately eight rpm within the pre-dryer kiln. The kiln has an annular chamber surrounding the dryer for receiving gas generated in the process as will be explained later. During this step of the process the moisture content is reduced to at least 15 percent. Next the blend is transferred by either belt feed or auger feed through line 10 to a combuster/rotary kiln 11. Kiln 11 has approximately 9 inches of refractory lining and rotates at about one and one-half rpm. The action of said kiln 11 creates both an ash by-product and gases of combustion. This step in the process also destroys pathogens. The ash produced is conveyed from the combuster/rotary kiln 11 to an ash receiver or bin 13 through line 12. Gases from the combuster/rotary kiln 11 travel by tube 14 to thermal oxidizer 15. The gases of combustion produced in the combuster/rotary kiln are subjected to a temperature between 1500 degrees Fahrenheit to 1700 degrees Fahrenheit in the thermal oxidizer. Some additional ash will precipitate and is then transferred through line 16 to ash receiver 13. Heated gases from the thermal oxidizer 15 are sent to the annulus of pre-dryer kiln 9. Heat transfer occurs within the pre-dryer kiln 9 which helps to maintain the temperature within the dryer chamber of the kiln thus increasing the efficiency of the process. The waste gases from which heat has transferred are then drawn through line 17 to a cooling tower 18 where their temperature is reduced to a range of 350 degrees Fahrenheit to 500 degrees Fahrenheit. From the cooling tower the gases are drawn to the baghouse controller 19 where additional ash is retrieved and forwarded to the storage bins 13 via pipe 21. Exhaust gases from the baghouse controller are removed by induced draft fan 22 which is in communication therewith and which draws all gases generated in the system toward the baghouse controller. An optional wet scrubber 23 may be provided between the baghouse controller and the induced draft fan to provide additional cleansing of the gases before they are released to the atmosphere. Fan Induced draft fan 22 is pneumatically in communication with the combuster/rotary kiln, the thermal oxidizer, the cooling tower and the baghouse controller. It creates a negative pressure which draws the gases produced at each of the stages through the process and ultimately exhausts the gases from the baghouse controller.

The thermal oxidizer 13 is a well known piece of equipment to those ordinary skilled in the art and is equipped with baffles which create multiple pathways for the gases of combustion of the instant process. The purpose of the thermal oxidizer is to further cleanse the gases to meet regulations of environmental protection agencies, specifically, functions to reduce the odor and hydrocarbons. Thermal oxidizers contemplated by the present invention are manufactured by Texas Incinerator.

The cooling tower is likewise well known in the art and is manufactured by Texas Incinerator. Essentially, it comprises a tank in which a fine mist of high pressure water is introduced to the waste gases. Finally, the baghouse controller is an item commercially available through either Texas Incinerator or Barber Green, for example. The air flume that results from all of these steps and which is exhausted by induced draft fan 22 meets all requirements of environmental regulations.

The ash by-product collected in the storage bins can be used as an aggregate substitute in the production of asphalt concrete, Portland Concrete or as a backfilling material for ditches or trenches. The ash by-product may also be used as a base stabilizer for wet soil during construction. Also, the ash by-product can be lawn spread or deposited in an approved landfill at much less cost and with less danger to the environment because its weight is much less than the combined wet weight of the unprocessed sludge and lime and because the pathogens have been destroyed.

What is claimed is:

1. A method for recycling sewage sludge comprising the steps of:
   a. Blending sewage sludge with spent water softener lime in a feed hopper to produce a mixture;
   b. Introducing said mixture into a pre-dryer kiln wherein said pre-dryer kiln maintains a temperature sufficient to evaporate water from said mixture;
   c. Subjecting said mixture to a refractory-lined combuster rotary kiln, said rotary kiln being maintained at a temperature of at least 1500 degrees Fahrenheit resulting in an ash by-product and gases of combustion;
   d. Removing said ash by-product to a storage area;
   e. Introducing said gases of combustion to a thermal oxidizer maintained at a temperature of between 1500 degrees Fahrenheit to 1700 degrees Fahrenheit resulting in an ash by-product and heated gases;
   f. Removing said ash by-product from said thermal oxidizer to said storage area;
   g. Transferring said heated gases to said pre-dryer kiln;
   h. Delivering spent exhaust gases from said pre-dryer kiln to a cooling tower maintained at between 300–450 degrees Fahrenheit to quench said spent exhaust gases;
   i. Passing said cooled spent exhaust gases to a baghouse controller;
   j. Extracting ash from said baghouse controller and storing it with said ash by-products from said thermal oxidizer and said combuster kiln and exhausting the baghouse controller.

2. A method for the preparation of ash by-product consisting essentially of sewage sludge solids and spent water-softener lime which comprises (a) mixing sewage sludge with spent water-softener lime wherein the ratio on a wet basis is approximately 10:1; and (b) pre-drying the resulting mixture in a rotary kiln; and (c) combusting the resulting mixture producing solid ash by-product and gases of combustion with entrained ash; and (d) thermally oxidizing said gases of combustion wherein they are subjected to a temperature in the range of 1700 degrees Fahrenheit producing additional solid ash by-product and heated gases with entrained ash; and (e) cooling said heated gases in a cooling tower wherein they are reduced to a temperature in the range of 300–450 degrees Fahrenheit; and (f) filtering said cooled gases in a baghouse controller wherein additional ash by-product is removed; and (g) exhausting all remaining gases; and (h) collecting said ash by-products in storage; and (i) recycling heat from said combusting and thermal oxidizing to said pre-dryer kiln to increase said kiln's efficiency.

* * * * *